United States Patent [19]

Feinstein

[11] Patent Number: 5,321,817
[45] Date of Patent: Jun. 14, 1994

[54] COMPUTER DATA INTERFACE THROUGH A REMOVABLE MAGNETIC STORAGE UNIT

[75] Inventor: David Y. Feinstein, Houston, Tex.

[73] Assignee: Innoventions Inc., Houston, Tex.

[21] Appl. No.: 823,986

[22] Filed: Jan. 22, 1992

[51] Int. Cl.$^5$ .............................................. G06F 3/00
[52] U.S. Cl. ................................... 395/325; 395/250; 395/500
[58] Field of Search ............... 395/425, 500, 250, 325; 235/492, 493; 360/137

[56] References Cited

U.S. PATENT DOCUMENTS

| | | | |
|---|---|---|---|
| 3,619,515 | 11/1971 | Lace | 369/11 |
| 3,946,156 | 3/1976 | Budrose | 369/1 |
| 4,034,164 | 7/1977 | Westmoland | 369/11 |
| 4,504,871 | 3/1985 | Berwick et al. | 360/31 |
| 4,701,601 | 10/1987 | Francini et al. | 235/449 |
| 4,814,591 | 3/1989 | Nara et al. | 235/380 |
| 5,159,182 | 10/1992 | Eisele | 235/492 |

*Primary Examiner*—David L. Robertson

[57] ABSTRACT

An interface system, preferably made in the shape and size of a standard removable magnetic medium, and inserted inside a removable magnetic storage unit such as a floppy disk drive or a tape backup drive, is disclosed. Magnetic communication means on the interface system, placed at a close proximity to the read-/write head of the magnetic storage unit, exchange data with the read/write head of the magnetic storage unit. The data protocol is similar to the one used by the magnetic storage unit so that the same standard storage unit can alternatively use both the interface system and the regular magnetic media. Several alternate embodiments of the magnetic communication means of the interface system are disclosed. Data from and to the magnetic communication means may be amplified, shaped, and possibly converted from serial format to parallel format by control circuitry which may be fully integrated inside the interface card. The interface system can interface a computer to virtually any external application system, and it is also usable for data communication between two or more computers.

17 Claims, 11 Drawing Sheets

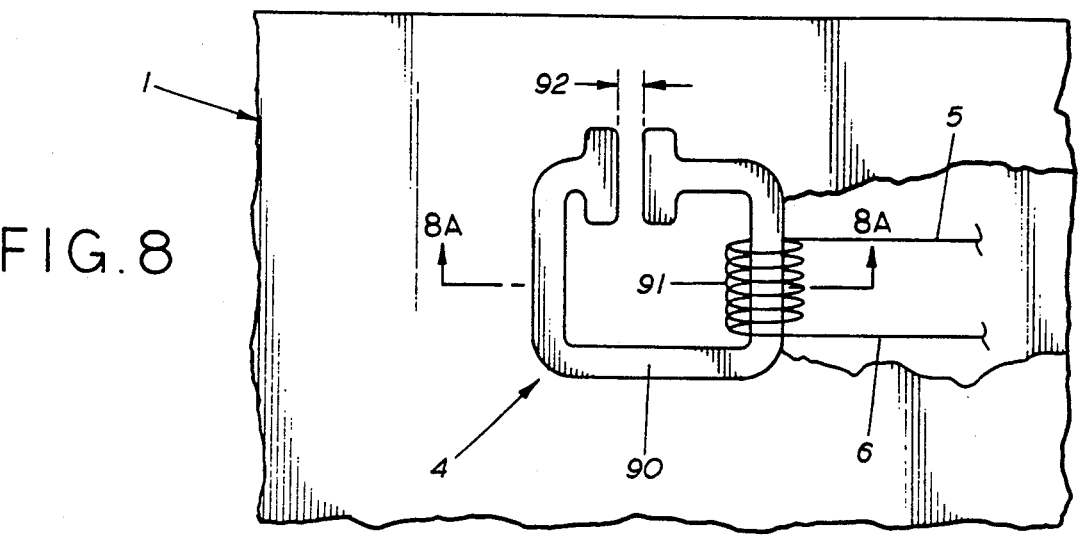
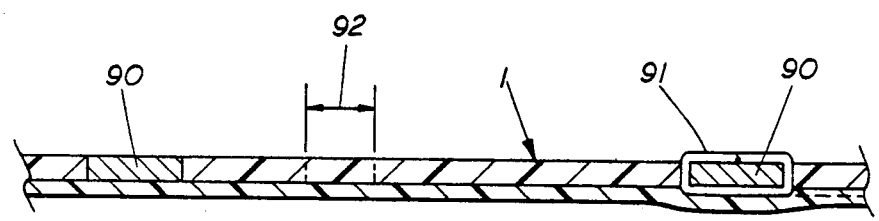
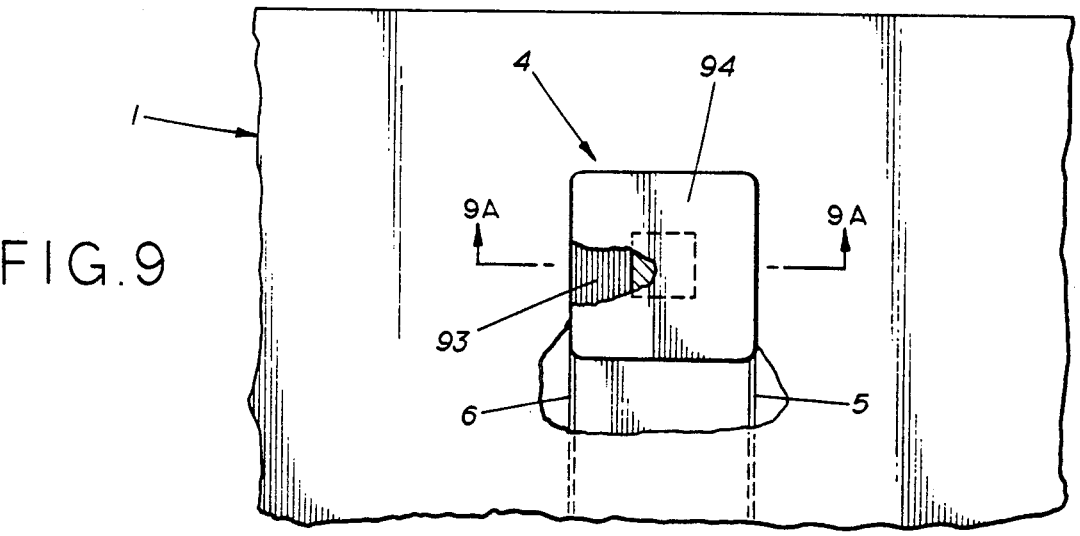
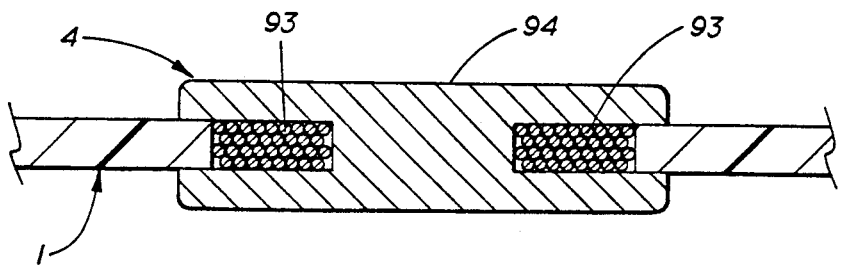

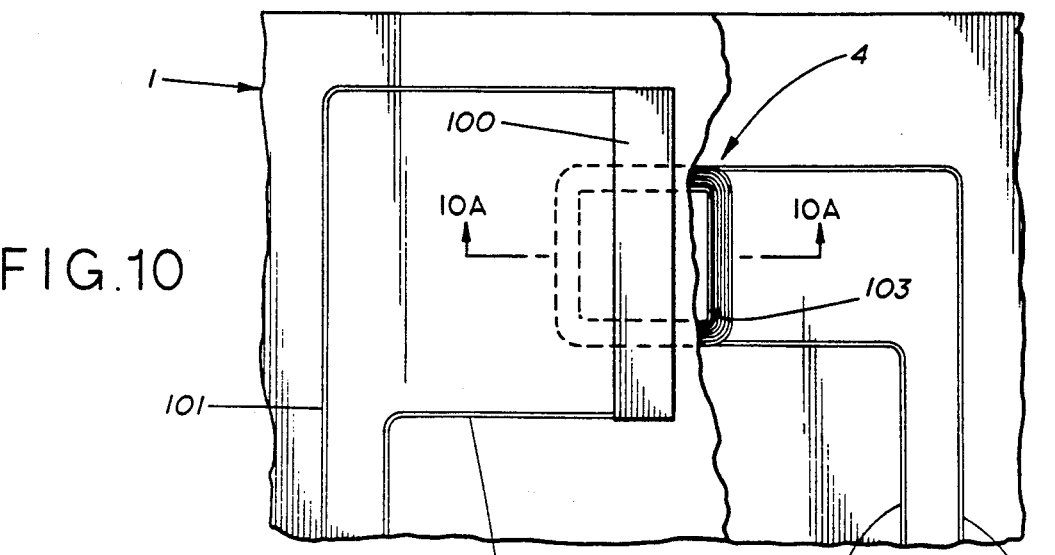
FIG.10
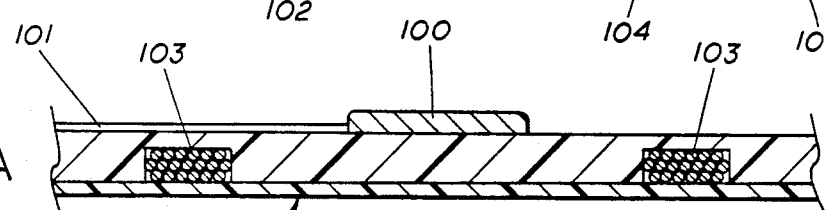
FIG.10A
FIG.10B
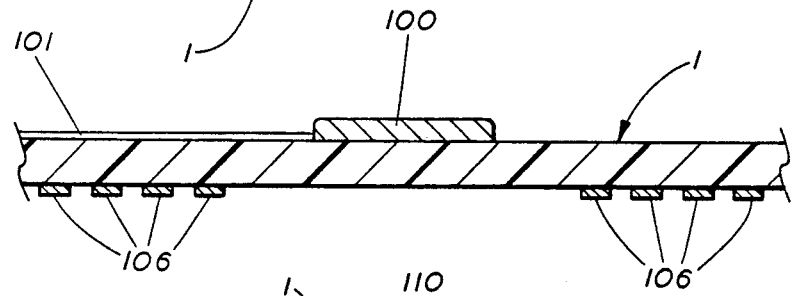
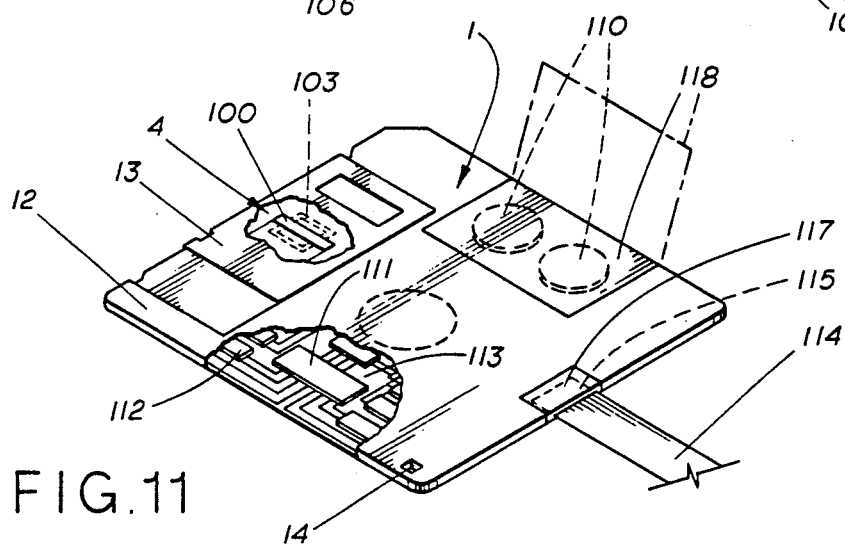
FIG.11

COMPUTER DATA INTERFACE THROUGH A REMOVABLE MAGNETIC STORAGE UNIT

BACKGROUND OF THE INVENTION

1. Field of the Invention

This invention generally relates to an interface apparatus in a computer system. More particularly, the present invention relates to a general purpose data input/output interface system through a removable magnetic storage unit.

2. Description of the Prior Art

Conventional computer data I/O interface systems have employed a serial or parallel bus connection through which the data is sent in either serial or parallel form to an external device. Over the years, various standards have evolved like the RS232 for the serial port and the Centronics printer interface for the parallel port. The popularity of these standard ports resulted in their inclusion in most of the computers manufactured today. These ports are being used to interface the computer to a large variety of devices, including printers and plotters, modems and other communication systems, control systems, instruments, device programmers, dataloggers, desktop computer to laptop computer communication and more.

One of the disadvantages of both the serial and the parallel ports is their relative low speed. A typical serial port device can work up to 64K baud, while a typical parallel port has a bandwidth of up to 100 Kbit/Second. Another related disadvantage is that since both ports do not employ a DMA (Direct Memory Access) mode of operation, they require full CPU attention during transfer of data.

Many applications need to be interfaced to the computer for only a relatively short period of time during an occasional file transfer. Since it is not possible to replace the current device which is connected to the port while the computer is still on, the ports have serious disadvantages for such short time applications. Also, as the ports are usually located at the rear of the computer, they have a limited access which make them even more unsuitable for frequent replacement of applications.

In addition to the standard serial and parallel ports, other application specific data I/O interface boards have been developed. Such interface boards are typically plugged in an expansion slot in the computer main board. While these boards provide the specific speed requirements of their applications, they are relatively costly, and they are also not useful for frequently replaced applications for the same reasons that limit the standard ports. Yet another disadvantage of such interface boards is the fact that any computer has a limited number of expansion slots into which such boards can be connected. With continuous development of applications that may be interfaced to the computer, the issue of available expansion slots becomes critical.

As the serial and parallel ports, as well as the application specific data I/O interface boards, are directly wired to the external application, any hazardous electrostatic charges or noise which is either attacking the external application or generated within it, will in turn propagate through the connection wiring directly into the computer circuitry and may cause significant damage. This is clearly another problem associated with the prior art.

SUMMARY OF THE INVENTION

With these problems in mind, it is therefore an object of the present invention to provide a computer external data interface which can be easily connected and disconnected to the computer through its front panel while the computer continues to operate.

Another object of the present invention is to provide such an interface apparatus which can operate at a relatively high speed of data transfer and which can utilize a DMA mode of operation to reduce CPU overhead.

Still another object of the present invention is to provide such an interface apparatus without the need of installing a permanent interface card inside the computer.

Yet another object of the present invention is to provide such an interface apparatus that will not be directly connected to the computer circuitry so that any adverse electrostatic charge which affects the interfaced application will not propagate into the computer.

Still another object of the present invention is to provide such an interface apparatus at a relatively low cost using readily available components.

Briefly stated, the present invention is an interface system comprising an electronic card with a magnetic read/write head and control circuitry which is inserted into an existing magnetic storage device having a removable storage medium such as a floppy diskette or a magnetic tape. The interface system is made in a shape similar to the shape of the corresponding removable storage medium so that it can fit the standard magnetic storage device without any modification. When the interface system is inserted into the magnetic storage device, its magnetic read/write head is placed near the recording head of the storage device. While the interface system is emulating the magnetic behavior of the magnetic recording medium, the computer can output data to the interface medium or input data from it. During the computer output operation, the magnetic read/write head reads the magnetic signals generated by the recording head. The control circuitry of the interface system translates this signal to a usable form for applications connected to the interface system. During the computer input operation, the magnetic read/write head creates varying magnetic fields which are read by the magnetic storage device's head much the same as if it reads data from the removable magnetic recording medium.

An advantage of the present invention is that it is compatible with most existing computers since almost all existing computers have already at least one floppy diskette drive.

Another advantage of the present invention is that it provides a fast data transfer at the highest possible data rate of the floppy disk controller, without the mechanical overhead of the servo controlled head and a rotating magnetic medium.

Yet another advantage of the present invention is that a typical floppy disk drive is rated for hundreds of thousands of insertions/removals which are comfortably performed at the front of the computer with an easy access and at a Zero Insertion/Removal Force.

Still another advantage of the present invention is that it is fabricated with commonly available off-the-shelf components.

These and other objects, advantages, and features shall hereinafter appear, and for the purpose of illustrations, but not for limitation, exemplary embodiments of the present invention are described in the following detailed description and illustrated in the accompanying drawings in which like reference numerals designate corresponding elements.

BRIEF DESCRIPTION OF THE DRAWINGS

FIG. 8 is a diagrammatic plane view of the read/write head of the interface system of the present invention utilizing a planar air gap.

FIG. 8A is a section view taken along line 8A of FIG. 8.

FIG. 9 is a diagrammatic plane view of the read/write head of the interface system of the present invention utilizing a vertical planar coil.

FIG. 9A is a cross section view taken along line 9A of FIG. 9.

FIG. 10 is a diagrammatic plane view of a combined magnetoresistive read head and a planar coil write head of the present invention.

FIG. 10A is a cross section view taken along line 10A of FIG. 10 illustrating the use of a thin wire wound coil for the write head implementation.

FIG. 10B is a cross section view taken along line 10A of FIG. 10 illustrating the use of a planar coil for the write head implementation.

FIG. 11 is a perspective view of a more integrated implementation of the present invention in the form of a standard 3.5" diskette.

DETAILED DESCRIPTION OF THE INVENTION

This invention interfaces data between a host computer and an application system by means of an interface system which may be made in the shape of a standard removable magnetic medium. To avoid repetition, the following description illustrates only three of the most popular standards, the 5.25" diskette, the 3.5" diskette and the mini data cartridge tape. The term "data interface" means the communication of data in either bidirectional (read/write) or unidirectional (read only or write only) fashion.

Figure 1:
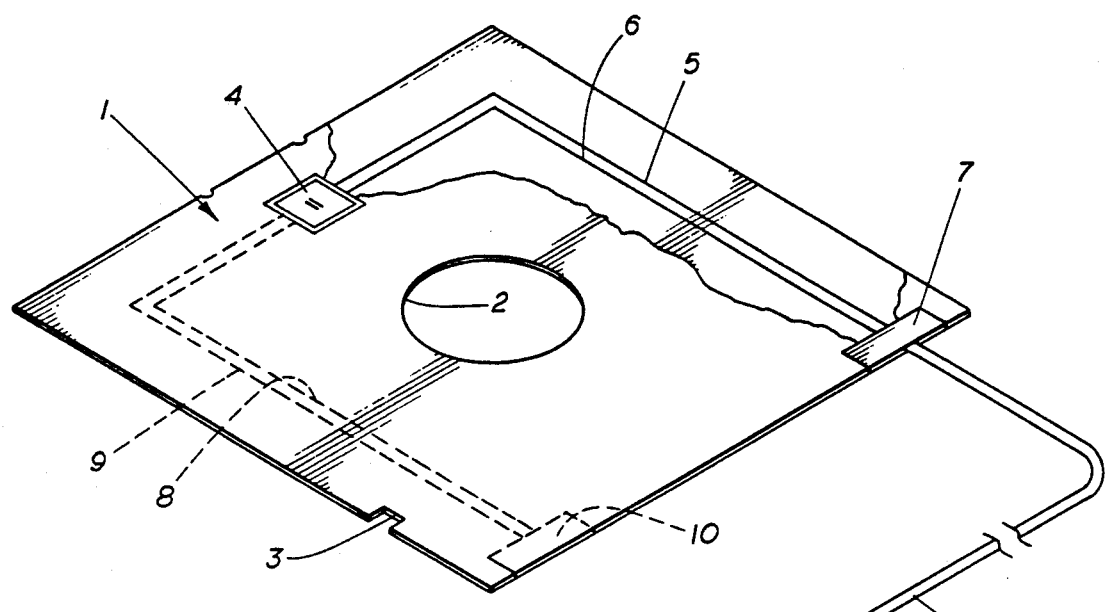
FIG. 1 shows the embodiment of the present invention in an interface system which may be used by a standard 5.25" floppy disk drive.

FIG. 1 shows the embodiment of the present invention in an interface system to be used by a 5.25" floppy disk drive. The system is housed in an interface card 1 which has size and shape similar to the standard 5.25" floppy diskette so that it can be easily inserted inside the disk drive. While a smaller size card or a card of completely unrelated shape may be inserted into the disk drive, having similar dimensions and the same shapes of the standard diskette provides better mechanical stability once the card is inserted. The interface card 1 is made of a thin PCB material which is commercially available in both rigid and flexible forms. The interface card has a center hole 2, which is preferably larger than the center hole of a standard floppy diskette since it is not desired that the interface card 1 be engaged by the spindle motor of the disk drive. The interface card 1 may optionally have the open write-protect notch 3 to insure compatibility with standard drives and with standard floppy disk controllers. A planar read/write head 4 is located on the interface card 1 at a place which is easily accessible by the disk drive's read/write head when the card is inserted in the drive. During interface operation the read/write head 4 directly communicates with the disk drive's read/write head by generating and detecting magnetic flux variations. The head 4 is further connected via two or more connections 5,6 to an exterior connector 7. Since the connector 7 needs to be accessible outside the disk drive, it is placed near the corner of the interface card so that it will not interfere with the disk drive's locking lever ("door"). The standard 5.25" disk drive specifications do not dictate the exact location for the drive's locking lever, and therefore some drives may have their locking lever on the right side, interfering with the location of the connector 7. To avoid this mechanical problem, the card can incorporate an alternate set of connections 8 and 9, and an alternate connector 10 which is placed near the other corner of the interface card. The interface card 1 may be protected by an insulation coating or by a plastic jacket similar to the one used in the standard 5.25" diskette. The connector, either 7 or 10, is connected to the interfaced application system 20 via the cable 11. The application box 20 contains the electronic circuitry and power source which controls the read/write head 4. Other embodiments of the present invention, where the application's electronic circuitry and power source are integrated in the interface card itself, are described below. The application system 20 can be virtually anything that can benefit from an interface to a computer. Several detailed examples of such applications are described below.

Figure 2:
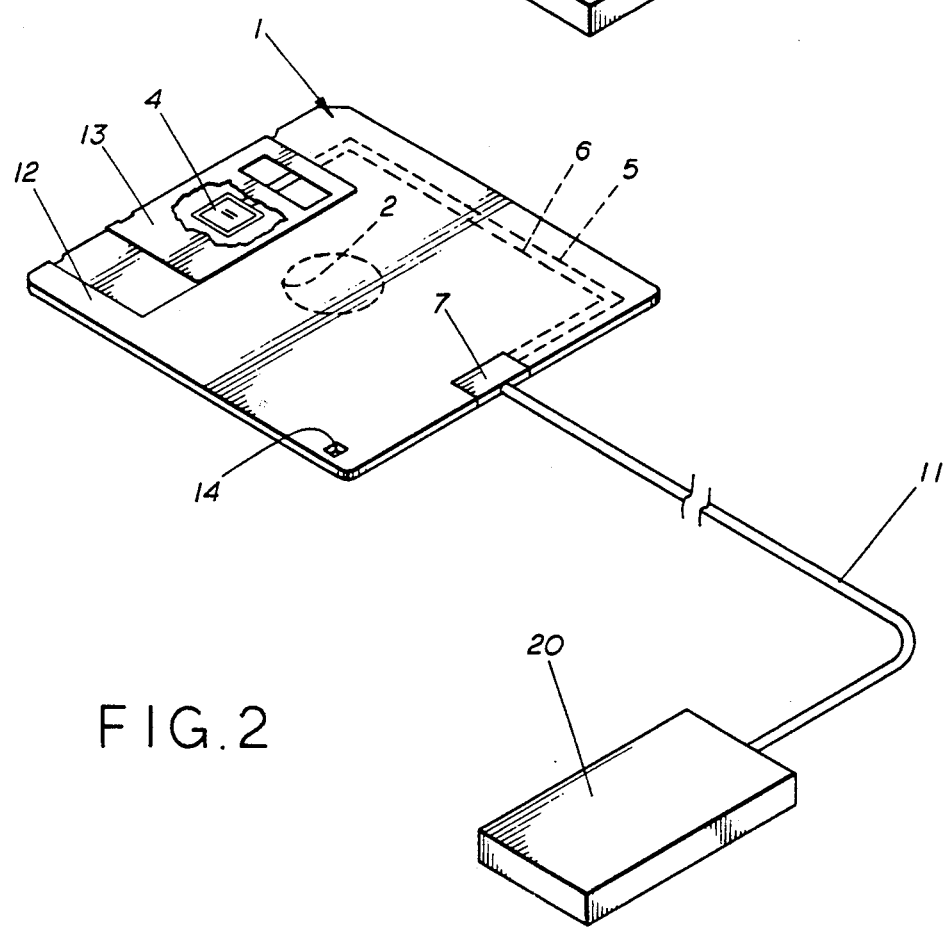
FIG. 2 shows another embodiment of the present invention in an interface system which may be used by a standard 3.5" floppy disk drive.

FIG. 2 illustrates another embodiment of the invention in the size and shape of the 3.5" standard diskette. The interface system includes an interface card 1 which is housed inside an enclosure 12. The enclosure 12 is preferably made from plastic materials and it is similar to the one used for enclosing the standard 3.5" diskette. The readwrite head 4 is protected by the same metallic cover 13 which protects the recording area of the standard 3.5" diskette. This cover is automatically moved aside to expose the read/write head 4 when the unit is inserted into the disk drive. The connector 7 is placed in the middle of the back edge of the interface card 1 as the 3.5" standard disk drive has its widest opening in its middle and there is an eject button instead of a locking lever. The optional write-protect hole 14 is left open to emulate a non write-protected diskette.

Figure 3:
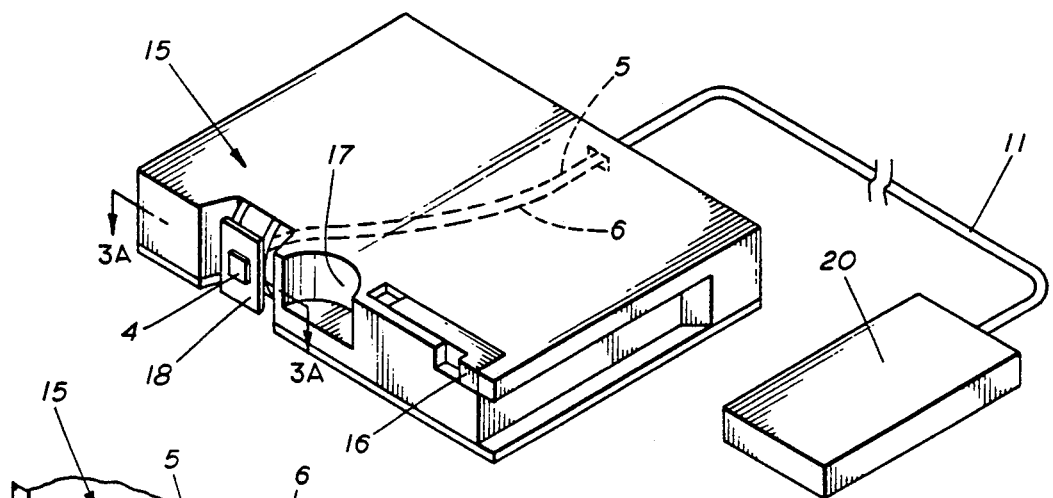
FIG. 3 shows the embodiment of the present invention in an interface system which may be used by a standard tape backup drive.
Figure 3A:
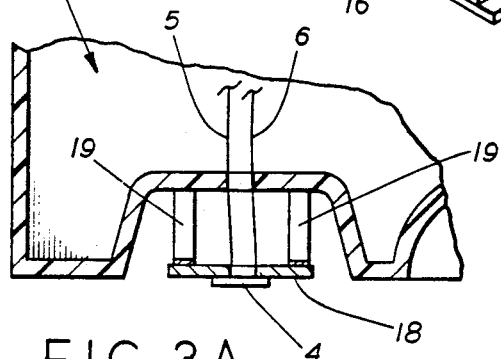
FIG. 3A details a cross section view of the area of the read/write head in the interface system of FIG. 3.

FIG. 3 illustrates yet another embodiment of the present invention in an interface system which may be used by a standard tape backup drive. The interface system is preferably enclosed in a plastic housing 15 similar in shape and size to the standard mini data cartridge tape. Although smaller size housing may still comfortably be inserted into the tape backup drive, it is preferable to make the housing 15 in the exact dimensions of the standard cartridge to insure stable mechanical retention inside the tape drive. The housing 15 may optionally have the same record-protect switch 16 of the standard mini data cartridge which is left at the "record" position. An empty recess 17 is left on the housing in the location where the mini data cartridge has a motor engagement wheel to insure compatibility with existing tape backup drives. The read/write head 4 is built on a small board 18 which is mounted vertically to the plane of the interface system at the point where the tape drive's read/write head will engage the interface system. FIG. 3A is a partial cross section view of the read/write head 4 taken along line 3A in FIG. 3. Flexible strips 19 or similar flexible retention means hold the board 18 and provide proper retention with the tape drive's read/write head when the interface system is inserted into the tape drive.

Since it is desirable to connect the interface system of the present invention to an existing disk drive or tape backup drive in the computer, we have shown the three embodiments described in FIG. 1-3 as they correspond to the most popular drives in the market. In general, as the interface card shown in FIG. 2 is much thicker than the one shown in FIG. 1, it is easier to manufacture. Although the 5.25" disk drive is more popular than the 3.5" disk drive, in recent years the 3.5" become available in almost all new computers. The interface card shown in FIG. 3 has the largest volume which allows more integration inside it. However, the tape backup drives are significantly less available in existing computer systems in comparison to the disk drives.

Figure 4:
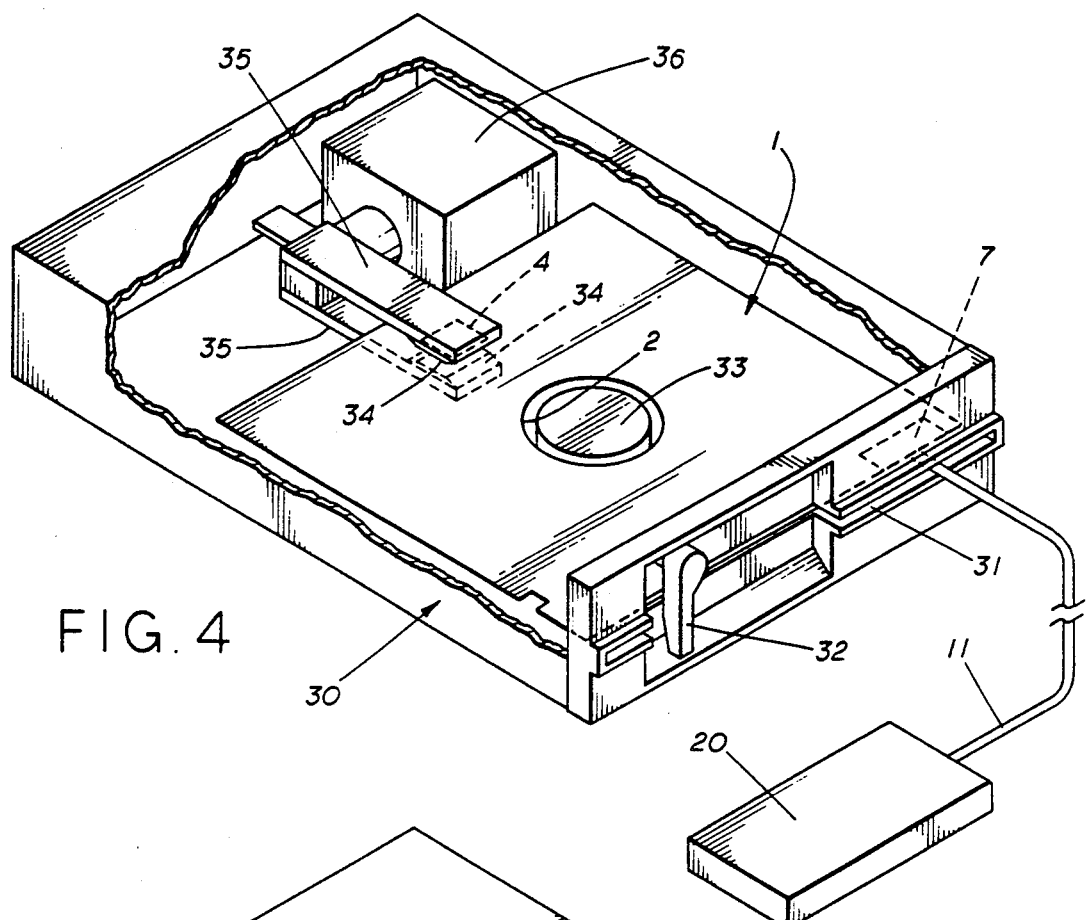
FIG. 4 is a perspective view of the mechanical arrangement of the present invention when used with a floppy disk drive.

FIG. 4 shows a perspective view of the mechanical arrangement of the interface system of FIG. 1 inside a standard 5.25" floppy disk drive 30. A similar arrangement occurs when using the interface card of FIG. 2 inside a standard 3.5" floppy disk drive. The drive 30 is a part of a host computer system which is not shown in the drawing for clarity. Its primary function is to record and playback data on the floppy diskette as a secondary storage unit of the computer. When used in accordance with the present invention, the interface card 1 is inserted into the disk drive 30 through its diskette entry slot 31 much the same as if it was a standard floppy diskette. The drive's secure the interface card inside the drive. The interface card 1 has a larger circular hole 2 in its center so that it is not engaged by the spindle motor 33 of the disk drive. The read/write head 34 of the moving head assembly 35 of the diskette drive is placed by its linear stepping motor 36 at track 00 position and brought down to engage the read/write head 4 of the interface card 1. Track 00 position is the position corresponding to the outermost track of the standard diskette. When the head 34 is set at this position, the drive is adapted to send a TRACK 00 signal to the drive controller. Since the interface card's read/write head 4 is placed on the track 00 position, a TRACK 00 signal from the drive indicates that the interface system's read/write head 4 and the drive's read/write head 34 are in the correct position to interface. Of course, any other track position can be used but this will add some additional overhead of stepping the drive head over the preset track location.

Figure 5:
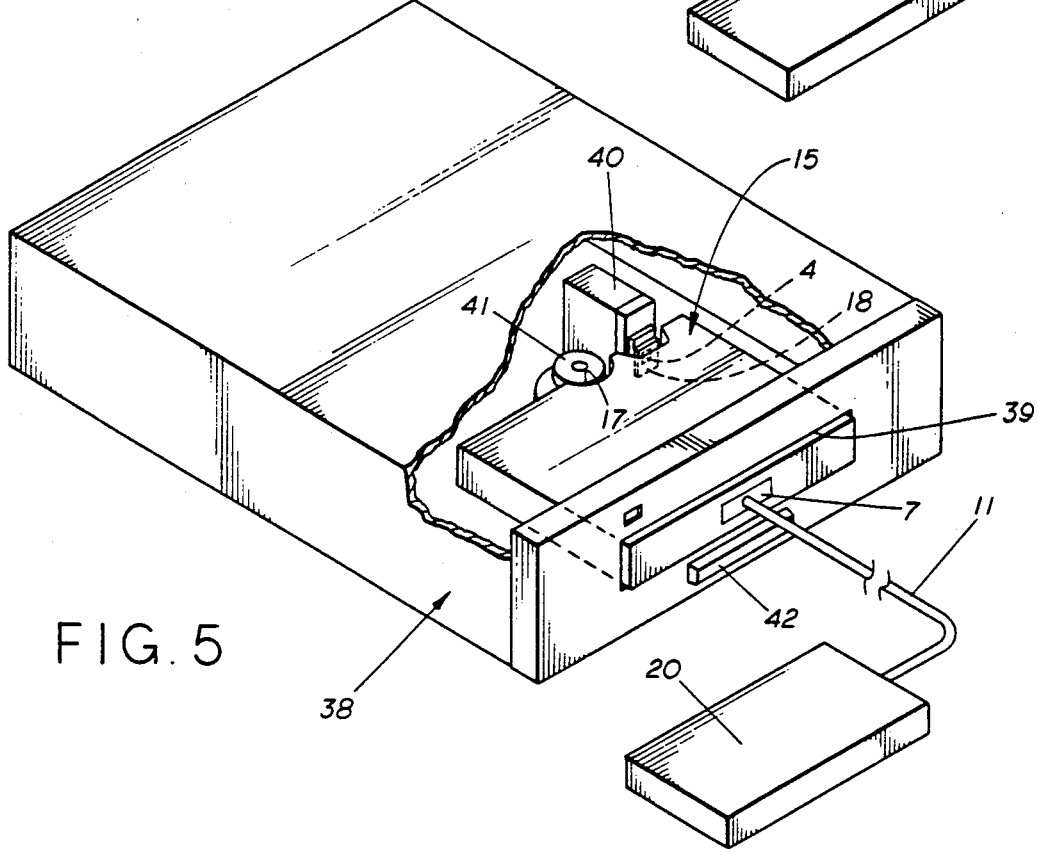
FIG. 5 is a perspective view of the mechanical arrangement of the present invention when used with a tape backup system.

FIG. 5 shows a perspective view of the mechanical arrangement of the interface system of FIG. 3 inside a standard tape backup drive 38. The housing 15 of the interface system is inserted into the drive 38 through its cartridge entry slot 39 as if it was a standard mini data cartridge tape. When inside, the tape drive's read/write head 40 is engaging the interface card's read/write head 4 in parallel. The tape transport wheel 41 of the tape drive is free to rotate without engaging the housing 15 due to the recess 17. The interface card may be removed from the tape backup drive when the user presses the eject button 42. Most of the standard tape backup systems 38 for use with personal computers employ one assembly of read/write heads for a single track recording. To increase throughput of data, it is possible to use tape backup drives which utilize a plurality of read/write heads to create a multi-track recording. In such an arrangement, the data to be recorded is divided into a number of serial data streams corresponding to the number of read/write heads. The heads are usually placed along a line vertical to the movement of the tape so that the width of the tape is divided into the same number of tracks. The data is simultaneously recorded on the tracks, and later, the recorded data is simultaneously played back. The present invention can accommodate such a possibility by also employing a plurality of read/write heads which correspond to the drive's multiple read/write heads. These read/write heads are mounted on board 18 so that they are brought in close proximity to the drive's read/write heads. Data backup storage systems employing a multi-track recording scheme are much less popular in comparison to backup systems employing a single track.

Figure 6:
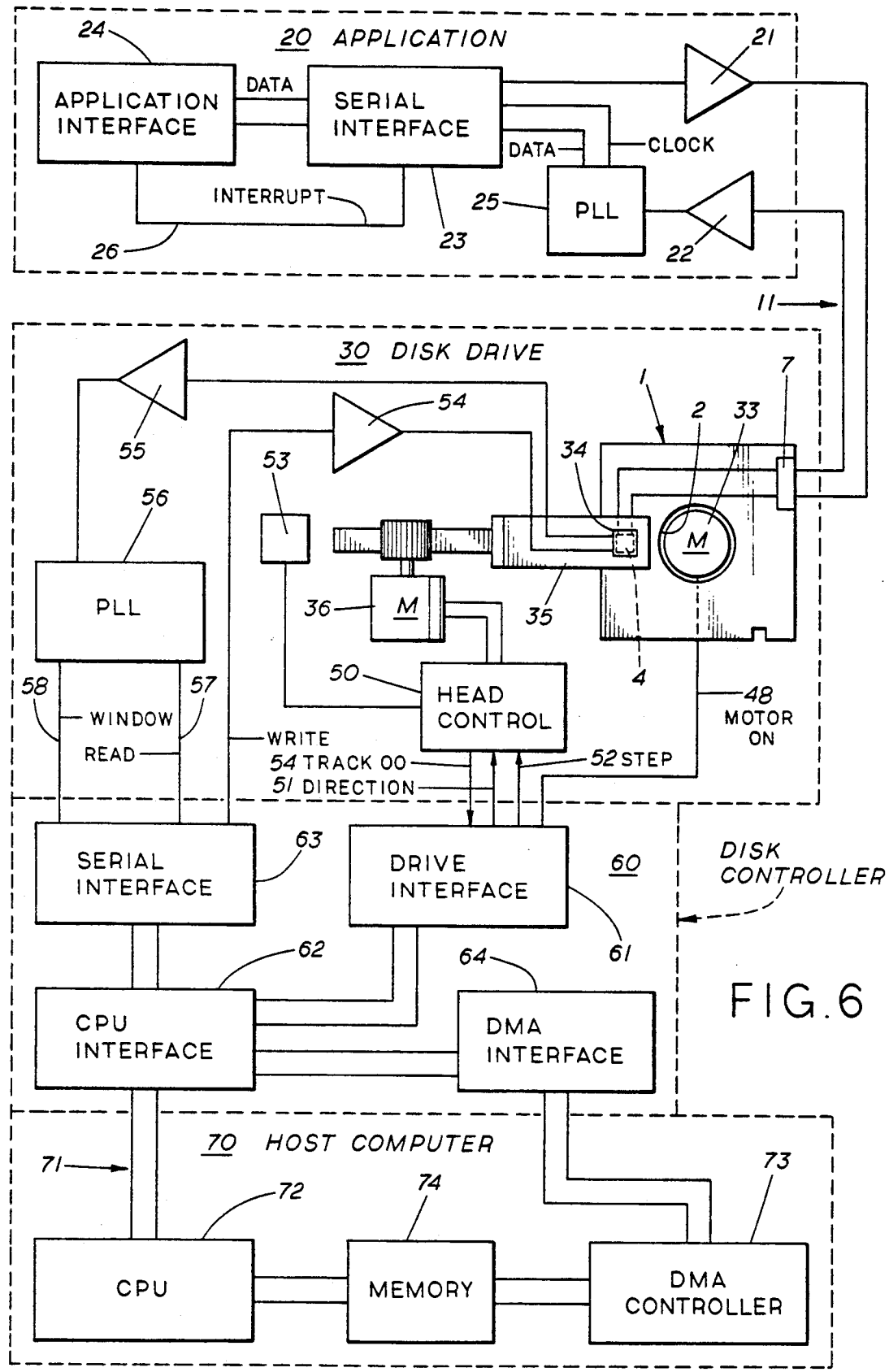
FIG. 6 is an electrical block diagram of the present invention.

FIG. 6 shows the electrical block diagram of the present invention. Although the interface system is represented by an interface card 1 of the shape of a floppy diskette, the underlying principles are the same for an interface system made in the form of the mini data cartridge tape and its equivalents. The interface card i is inserted into the diskette drive 30 much the same as if it was a regular diskette. The floppy diskette drive 30 is controlled by the floppy disk controller 60 which in turn is interfaced to the host computer system 70. During normal diskette operation (not shown in the drawing), the diskette is rotating at a constant speed (typically 300 or 360 RPM) by the spindle motor 33 which is activated by the signal MOTOR ON 48 from the floppy disk controller 60. When the interface card 1 is used, the MOTOR ON signal 48 is deactivated at all times as there is no need for any magnetic medium rotation. To protect against possible movement of the spindle motor 33, the hole 2 of the interface card 1 is made larger so that the card is not engaged by the motor at any time. When the drive 30 is selected by the disk controller 60, the read/write head 34 of the moving head assembly 35 is brought down to a close contact with the read/write head 4 of the interface card 1. A linear stepping motor 36 is adapted to step the read/write head 34 from one track to another during the SEEK OPERATION MODE. The head control unit 50 controls the movement of the linear stepping motor 36 in accordance with the floppy disk controller signals DIRECTION SELECT 51 and STEP 52. The DIRECTION SELECT signal 51 determines if the moving read/write head assembly 35 steps in the outward or the inward direction. The STEP signal 52 initiates a movement of the moving head assembly from one track to an adjacent track (e.g. from track 00 to track 01 when the direction is set to be inward). In some designs, two or more STEP signals are required to move along a pair of adjacent tracks. A position detector 53 is actuated when the moving read/write head is placed at TRACK 00, and the head control unit 50 transmits the TRACK 00 signal 54 to the floppy disk controller 60. In addition to the head movement control signals, a regular diskette (not shown in the drawing) is further equipped with an orientation hole which is monitored by a photoelectric detector in the disk drive to generate an INDEX signal to the floppy disk controller, which signals the start of a track. When the disk drive 30 is used with the present invention, the INDEX signal has no use as the interface card 1 does not rotate and the read/write head 4 is preferably placed already along the center line of the interface card 1 directly under the moving head assembly 35. The head movement control signals are used only during initialization when the read/write head 34 is brought over the interface card's read/write head 4, preferably at track 00. The stepping motor 36 may be used to perform occasional adjustments of the placement of the read/write head 34 in comparison to the interface card's read/write head 4 in order to achieve the best magnetic coupling.

During the interface operation, the read/write head 34 of the disk drive 30 communicates through magnetic induction (coupling) with the corresponding read/write head 4 of the interface card 1. Analog amplifiers and signal conditioners 54 and 55 within the floppy disk drive 30 are used to amplify and preshape the read and write signals. A Phase Lock Loop—PLL circuitry 56 analyzes the raw serial read stream and extracts a READ signal 57 and WINDOW (clock) signal 58 which are further sent to the disk controller 60. The PLL 56 is employed mainly for use with the standard diskette as the read signal from the rotating standard diskette is being subjected to noise, magnetic imperfections of the magnetic surface, and mechanical flutter. When used with the interface card 1 of the present invention, there is no rotation induced flutter, so the signal transmitted through the read/write head 4 of the interface card 1 is relatively clear even before processing by the PLL circuitry 56.

The floppy disk controller 60 provides all the functions of interfacing the floppy disk drive 30 to the host computer 70. The drive interface section 61 of the floppy disk controller provides all the moving head and spindle motor control signals. With the interface card 1, these functions are limited to disabling the spindle motor 33 and stepping the read/write head 34 over the interface card's read/write head 4. The CPU interface section 62 of the floppy disk controller 60 receives and performs the control signals from the host computer system 70. It also communicates data to and from the host computer during non-DMA data transfer. The parallel data to and from the host computer bus are converted to serial form by the serial interface section 63. This serial data is the actual data recorded and retrieved from a regular floppy diskette, and with the interface card 1, this is the actual interfaced data stream. The write data stream from the serial interface 63 is sent to the write amplifier 54 of the floppy disk drive 30. The read data 57 and the extracted clock (WINDOW) signal 58 are fed to the serial interface 63 from the PLL circuitry 56. A special form of CPU interface is the DMA mode which is used for block data transfer operations and controlled by the DMA CONTROL section 64 of the floppy disk controller. This DMA mode is critical to achieve the high transfer rate for both the interface card 1 and for the regular floppy diskette. The maximum overall data transfer rate of a disk controller is determined mainly by the magnetic resolution capability of the read/write head 34 and the rotation speed of the spindle motor 33. Since the present invention is not limited by these constraints, a possible option for the disk controller is to have at least two selectable data transfer rates, the lower one equal to the maximum data transfer rate attainable with a magnetic medium, and a higher transfer rate which can be selected when using the interface card 1.

The disk controller 60 is connected to the data bus 71 of the CPU 72 of the host computer 70. The DMA control section 64 of the disk controller interfaces directly with the host computer DMA circuitry 73, which writes and reads full blocks of data directly to the host computer primary high speed main memory system 74.

The interface card 1 is connected to the application system 20. In general, the present invention can interface application systems like modems, device programmers, instrumentation, interfaces to laptop computers and portable data logging devices, computer to computer communication and many more. In many cases the application system 20 is based on a micro-controller or even a complete computing system. The drawing shows schematically an application interface block 24 which is the portion of the application 20 which actually sends or receives data from the host computer 70. The application interface 24 is customized for any such specific application to provide the actual data and control signals required for the interface, as well as the required communication protocol.

The cable 11 provides the read/write serial streams of data which emulate the standard floppy diskette magnetic recording. The term "emulate" hereby means that the signal has the same frequency, shape and coding technique (e.g. NRZ, NRZI, MFM, RLL etc.). Such emulation of the standard floppy diskette magnetic recording is commercially important for the present invention as it allows the use of the interface card 1 in the huge installed base of disk drives without any modification to the disk drives. When the application system 20 needs to send data to the computer 70, the data from the application interface 24 is converted from parallel format to a serial format by serial interface circuitry 23 and then amplified and shaped by the write amplifier 21. When the computer sends a data stream to the application, the data is first amplified and reshaped by amplifier 22 and then a phase lock loop PLL circuitry 25 is used to separate the data stream into clock and data signals in a similar way to the process described above for the disk drive PLL 56. These signals are in turn connected to the serial interface 23 which converts the serial data stream into a parallel format which is applied to the application interface 24. Of course, some applications like the one described in FIG. 14, use the serial signals (both read and write) directly and therefore they do not require the serial interface 23. In many applications, it is easy to implement the application interface 24 by a micro-controller, which may also be the same micro-controller that performs the application 20. Since such a micro-controller performs other functions of the application, it is useful to base the data reception function of the application interface on an interrupt scheme. The serial interface 23 uses an interrupt line 26 to signal the application interface 24 when data have been received from the interface card 1. The micro-controller of the application interface 24 includes a microcode storage comprising an interrupt handler for handling the interrupt condition, usually by reading the received data or by sending a busy signal to the host computer 70. When the application 20 is based on a computer or micro-controller systems, a DMA circuitry similar to the one used by the disk controller 60 (62 and 64) can be employed by the application interface 24. The application 20 and its interface components as described above may be integrated inside card 1, as described in FIGS. 11 and 12.

Figure 7:
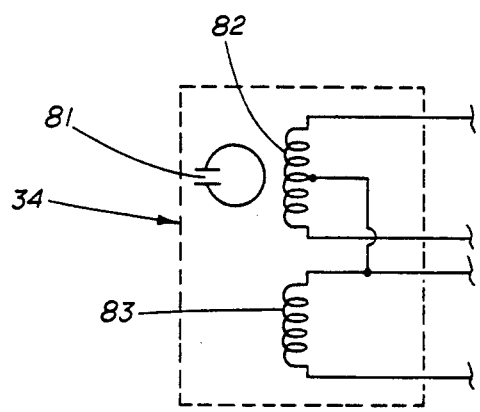
FIG. 7 is a schematic diagram of a standard read/write head of a typical disk or tape drive.
Figure 7A:
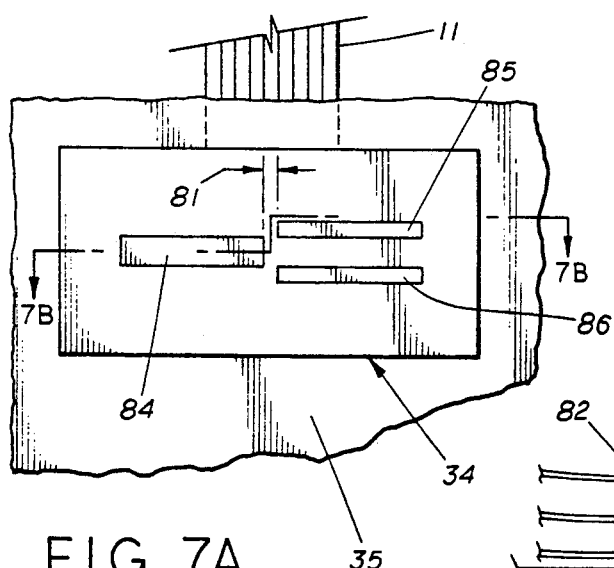
FIG. 7A is a plane view of the recording surface of the read/write head of FIG. 7.
Figure 7B:
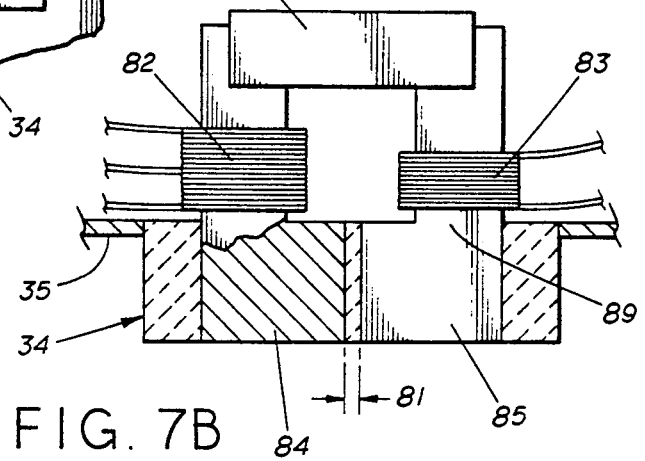
FIG. 7B is a cross section view of the read/write head of FIG. 7A taken along line 7B.

FIG. 7 illustrates the schematic diagram of a standard read/write head 34 of a typical disk or tape drive. The head has one air gap denoted by 81 and it typically has two coils, 82 and 83. FIG. 7A shows a plane view of the read/write head 34 which illustrates the surface of the head which is brought to contact with the recording media. The air gap 81 is formed between the end of the left pole 84 and the right pole which has two ends 85 and 86. The two parallel ends 85 and 86 of the right pole are limiting the length and the shape of the gap so that thin tracks can be defined on the magnetic media of the standard diskette. FIG. 7B shows a cross section view taken along line 7B in FIG. 7A. The ferromagnetic ring 88 ends with poles 84 and 85 to form the air gap 81. The ring is made from ferrite ceramics or magnetic alloys such as nickel-iron. Although the nickle-iron alloy has weaker magnetic properties compared to the ferrite ceramics, it is preferable because the ferrite has a disadvantage of being too brittle to form precise gaps. The ferrite ceramics also tend to deform at higher temperature. Both the pole ends 85 and 86 are actually forking out from the single pole 89. The two coils 82 and 83 create the desired magnetic flux during the write operation, and they are used to read the magnetic flux near the gap 81 during the read operation.

Since the read/write head 34 is designed to accommodate the standard diskettes, the main emphasis in its design is to have as small as possible an air gap which will trace the magnetic polarization of a tiny magnetic surface on the diskette. When used with the present invention, the actual placement of the gap for increased density of magnetic recording is of less importance. Instead, all that is required is the inductance of magnetic flux into the read/write head 34 during computer read operation, and the ability to sense the strong write magnetic fields generated by the head 34 during the computer write operation.

FIG. 8 shows a partial view of the interface card 1 illustrating the structure of its read/write head 4. The read/write head 4 is made of a relatively planar and thin magnetic ring 90 with a pickup coil 91 wound around the ring 90. The air gap 92 is oriented in parallel to the air gap of the read/write head of the floppy disk drive. The drawing shows the orientation for the typical longitudinal recording which is used by most disk drives. The air gap 92 is relatively wide in order to avoid the need for precise positioning of the disk drive read/write head. The coil 91 is wound on the side of the magnetic ring 90 so that its body does not prevent the drive's read/write head from achieving smooth contact with the air gap 92. FIG. 8A shows a cross section view taken along line 8A of FIG. 8. As the ring 90 is made from a very thin material, it may be embedded within the body of the interface card 1 so that the gap area 92 remains very thin. The design goal for the read/write head 4 is that it will be able to generate strong enough magnetic fields which will be sensed by the disk drive's read/write head even if the two heads are not exactly aligned. It also has to have the ability to sense the relatively strong write magnetic fields generated by the disk drive's read/write head during computer write operation. Therefore, even the brittle ferrite ceramics may be used as the ring 90 material as there is no need for a precise gap. In addition to the magnetic coupling through the air gaps, the pickup coil 91 can also crosstalk with the coils 82 and 83 of the read/write head of the disk drive which were shown in FIG. 7B.

FIG. 9 shows another embodiment of the read/write head of the interface card. In this embodiment, the read/write head 4 is made of a planar coil 93 which has a relatively short and wide magnetic core 94 made of magnetic materials such as ferrite ceramics or nickel-iron alloy. The coil 93 is placed flat on the interface card 1 so that its axis is perpendicular to the interface card. FIG. 9A shows a cross section view taken along line 9A in FIG. 9. Such arrangement creates a strong magnetic coupling between the coil 93 and the coils 82 and 83 of the read/write head of the disk drive as shown if FIG. 7B. The ferrite core 94 is made large enough so that the read/write head of the disk drive will be above it even when allowing for some reasonable mechanical misalignment when the interface card 1 is inserted into the disk drive. This embodiment also works better with the disk drive utilizing the perpendicular recording mode.

FIG. 10 illustrates yet another embodiment of the read/write head 4 of the interface card 1. A thin magnetoresistive head 100 is mounted on the interface card in the area to be contacted by the disk drive's read/write head. The magnetoresistive head 100 has its own sense leads 101 and 102 and the current flowing through them changes with the sensed changes in the magnetic field. This head is used for picking up the magnetic flux variations generated by the read/write head of the disk drive during the computer write operation. . Since magnetoresistive elements can only pick up magnetic signals but not generate them, a separate write head is needed. The write head 103 is made of a very thin planar coil which is placed under the magnetoresistive head 100. The write head 103 has its separate connections 104 and 105. FIG. 10A shows a cross section view taken along line 10A in FIG. 10. The write head 103 is used for generating the magnetic flux variations to be sensed by the disk drive read/write head during the computer read operation. Since the disk drive's read/write head must generate strong magnetic flux variations to record on a diskette, even a relatively low sensitivity pickup coil or magnetoresistive head in the interface card can pick up these magnetic signals. Also, since the disk drive's read/write head must be able to sense minute magnetic flux variations on the surface of the diskette during playback, even a relatively low power magnetic flux generator on the interface card should suffice. Therefore, the arrangement of FIG. 10 can employ a very thin planar coil for the write head as even a weak magnetic signal will be picked up by the disk drive's read/write head. FIG. 10B shows an alternate cross section view taken along line 10A of FIG. 10 in which such a planar spiral coil 106 is used for the write head function. This spiral coil may be formed by relatively inexpensive printed circuit technology or other metal depositing techniques. The coil 103 or the coil 106 may be placed on the same side of the card where the magnetoresistive head 100 is placed, using proper insulation.

The read/write head's signals can be amplified and processed inside the interface card of FIG. 2 when a more integrated implementation is desired as shown in FIG. 11. Commercially available ultra thin VLSI integrated circuits 111 as well as thin film passive components 112 are surface mounted on a thin printed circuit board 113 inside the interface card 1. This may include the read/write amplifiers, the PLL and other wave shaping circuitry, the serial interface circuitry and any of the application interface circuitry. In some instances, the entire application system may be integrated on the PCB 113 inside the interface card 1 Very thin button type lithium batteries 110 may be used to power the control circuitry. A multi-wire flat cable 114 connecting the external application system is mated to a flat connector 115. The latch 117 is used to secure the cable onto the flat connector 115. The latch 118 is used to secure the button batteries in place.

Figure 12:
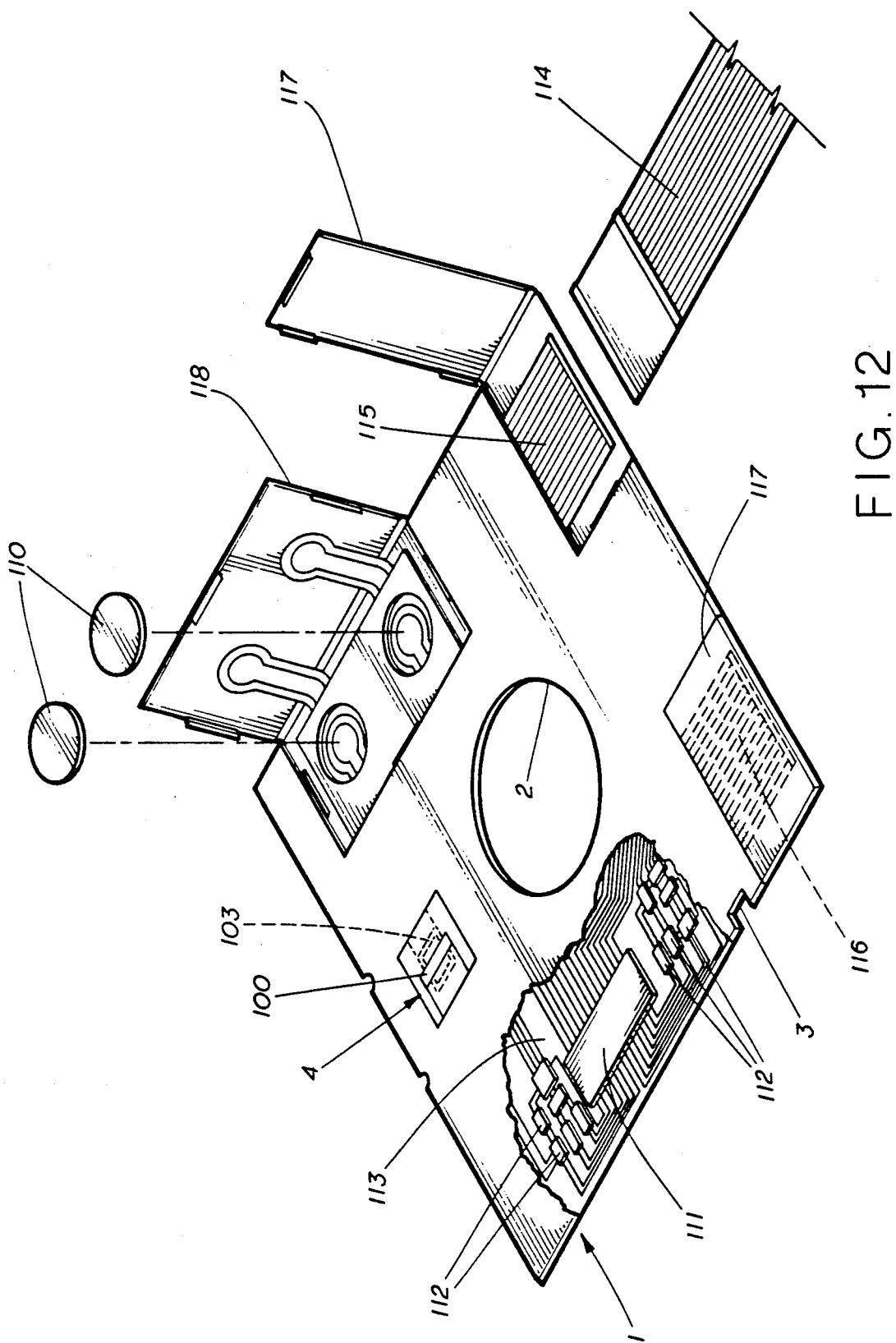
FIG. 12 is a perspective view of a more integrated implementation of the present invention in the form of a standard 5.25" disk.

FIG. 12 illustrates similar integration with the interface card 1 of FIG. 1. The interface card 1 is shown covered with a similar diskette jacket as the standard diskette to protect the internal electronic board 113. An alternate connector 116 is placed near the other corner of the card in order to accommodate disk drives with right side locking levers.

Figure 13:
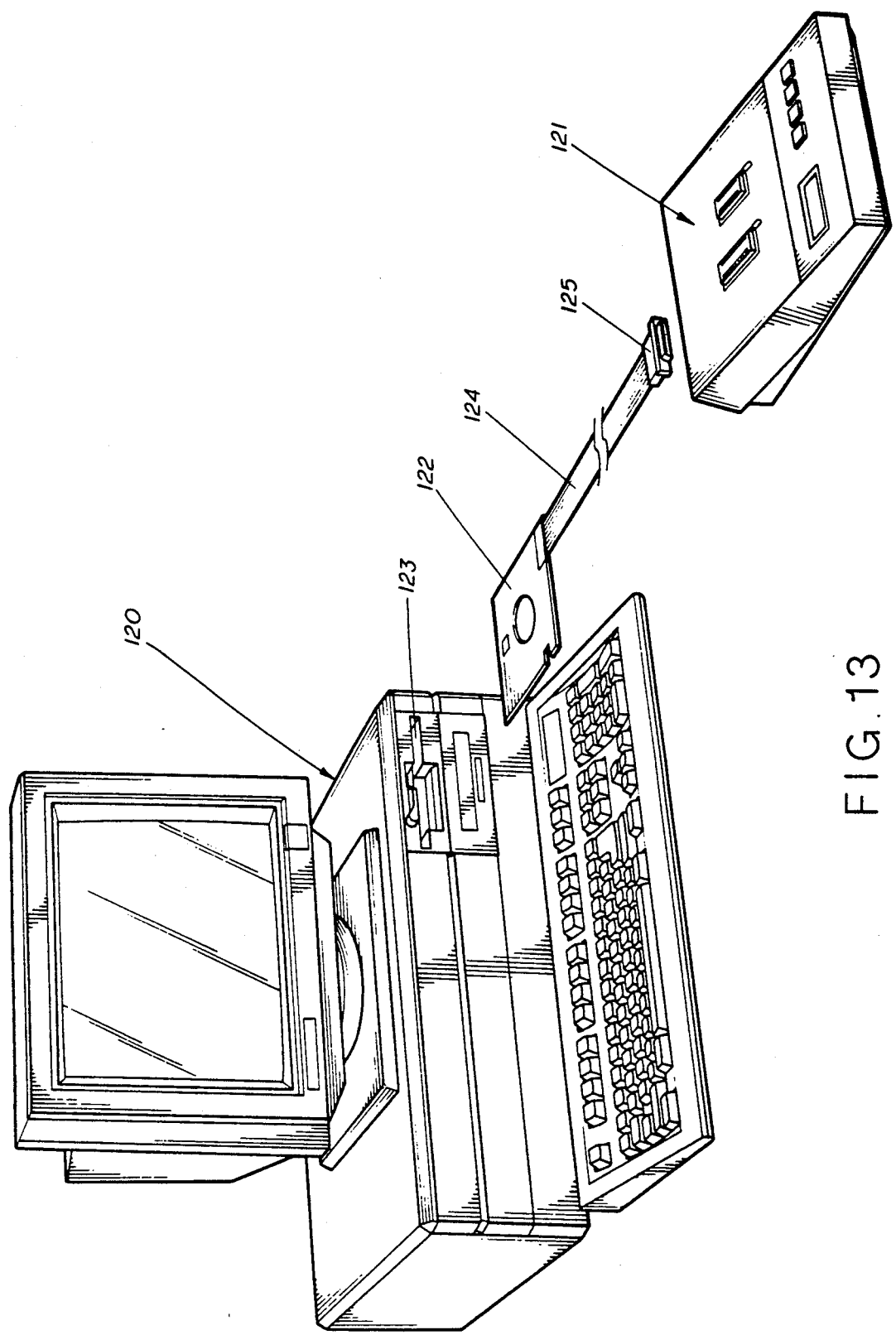
FIG. 13 illustrates an application of the present invention for interfacing a device programmer to a desktop computer.

FIG. 13 illustrates a perspective view of an application of the present invention for interfacing a personal computer 120 to a typical device programmer 121. The application for this example is a typical device programmer which uses its interface to the computer to download programing data and device data from the computer, and to send programming verification data back to the computer. An interface card 122 is inserted into the disk drive 123 of the personal computer 120. The cable 124 connects the interface card 122 with the application 121 through connector 125. The connector 125 allows the same interface card 122 to be used by other application systems. The prior art solutions for interfacing device programmers to a computer is either through a serial/parallel port or through a proprietary card. Both of these prior art solutions require accessing the back of the computer, and, in the case of the proprietary card, use of an internal expansion slot. One of the main advantages of the present invention is therefore clearly illustrated—it is easier and faster to connect (and remove) the device programmer through the front facing disk drive.

Figure 14:
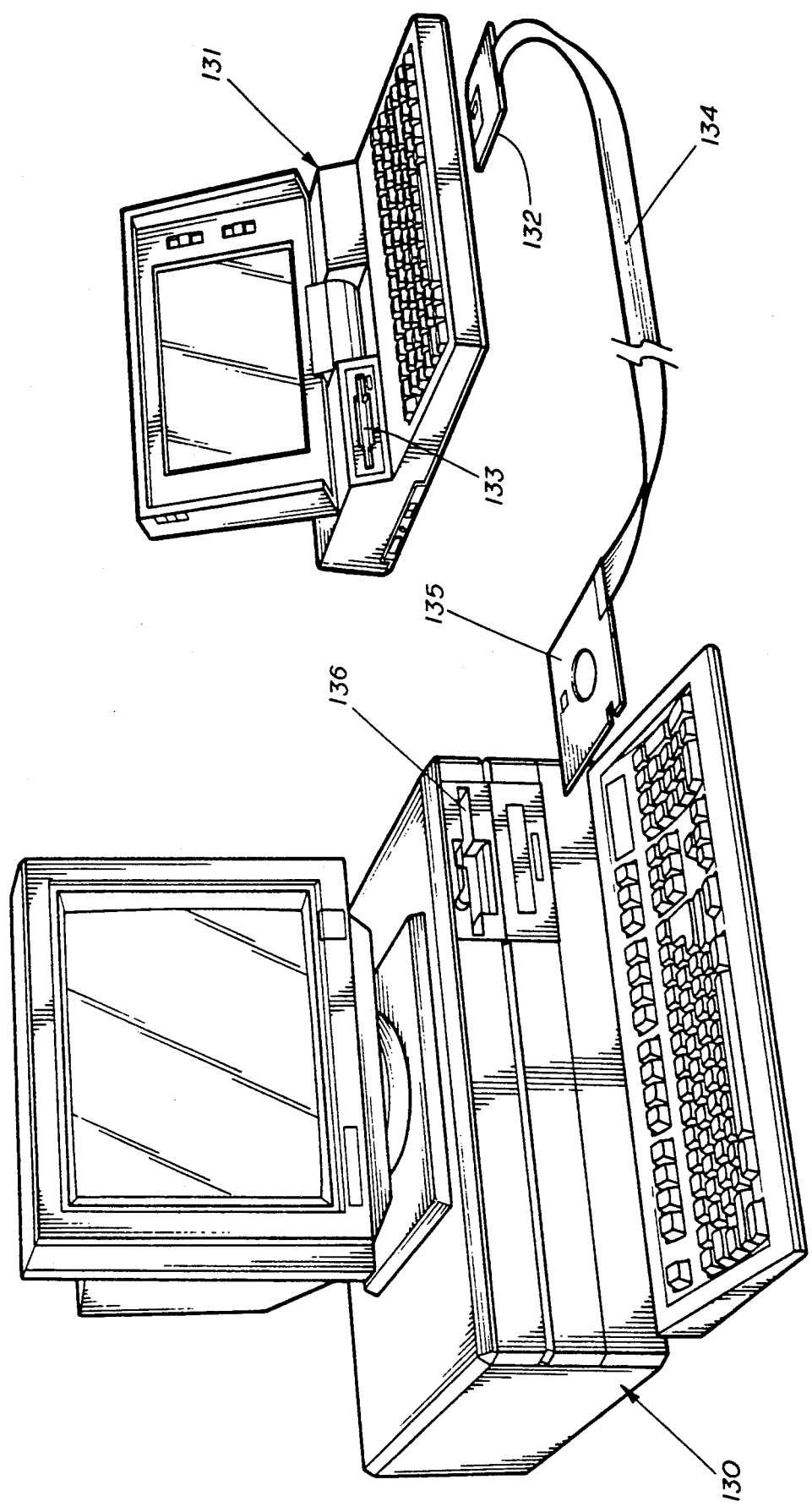
FIG. 14 illustrates an application of the present invention for direct file transfer between a desktop computer and a laptop computer.
Figure 14A:
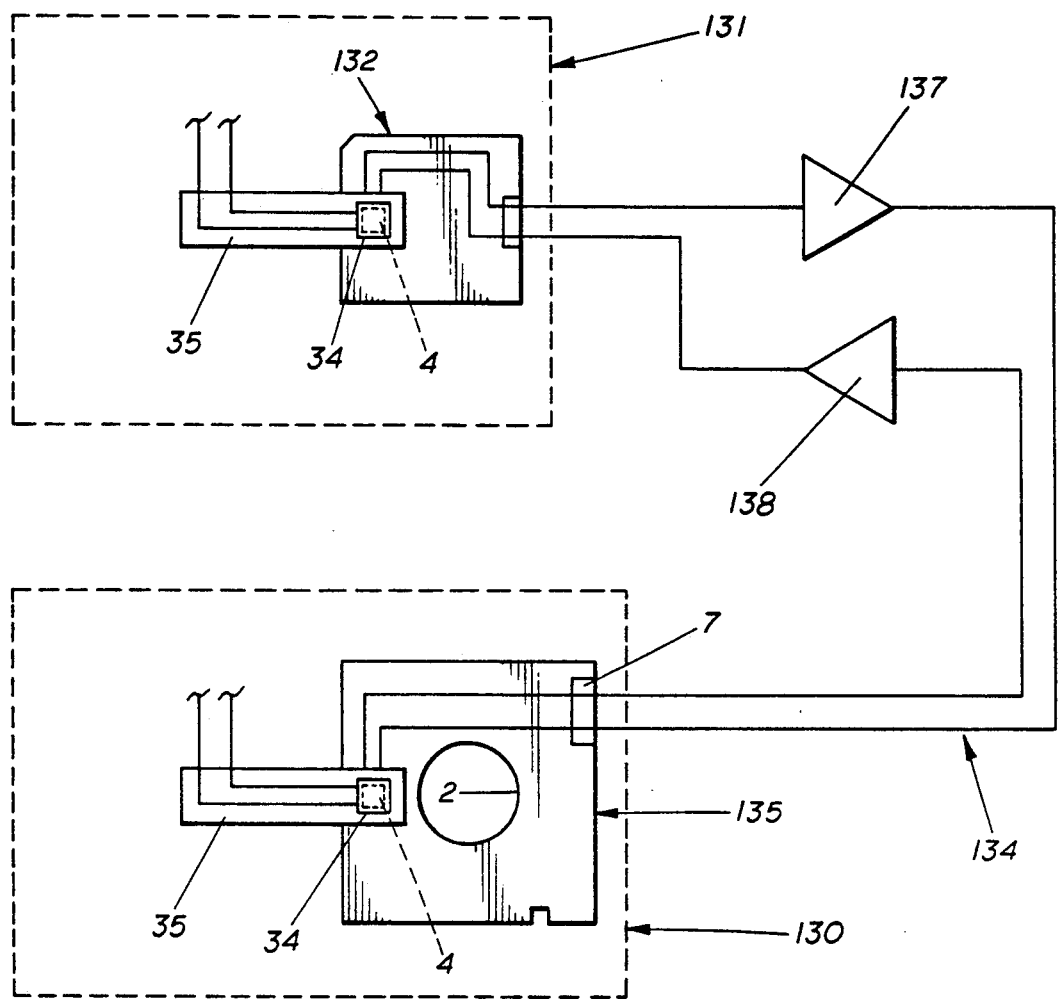
FIG. 14A shows the block diagram of the application shown in FIG. 14.

FIG. 14 illustrates a perspective view of another application of the present invention for a file transfer between a desktop computer 130 and a laptop computer 131. The laptop is portable and therefore it may have files that need to be transferred to the desktop computer. Also, the desktop computer typically has a much larger hard disk for data storage so that it is beneficial for the laptop computer to receive (download) data from the desktop computer. The same arrangement can further expand for a network of more than two computers. An interface card 132 integrated in the form of a 3.5" floppy diskette is inserted into the disk drive 133 of the laptop computer 131. The interface card 132 has the same structure as the one detailed in FIG. 11. The interface card 132 is connected through a cable 134 to another interface card 135 which is made in the form of a 5.25" floppy diskette. The second interface card 135 is inserted into the disk drive 136 of the desktop computer 130. The interface card 135 has the same structure as detailed in FIG. 12. As more and more desktop computers today have the standard 3.5" drives, the second interface card could also be made in the shape of the 3.5" diskette. FIG. 14A shows the block diagram of this application. For this application there is no need for converting the data stream from serial to parallel. The data received by the read/write head 4 of the interface card 135 is amplified by amplifier 138 and coupled to the read/write head 4 of the interface card 132. Similarly, data received by the read/write head of the interface card 132 is amplified by amplifier 137 and coupled to the read/write head 4 of the interface card 135. To improve noise immunity, each of the integrated interface cards may have both a read and a write amplifiers. Actually, the amplifiers may be integrated inside the interface cards as described in FIGS. 11 and 12, and cable 134 provides the connection for the two serial channels.

Figure 15:
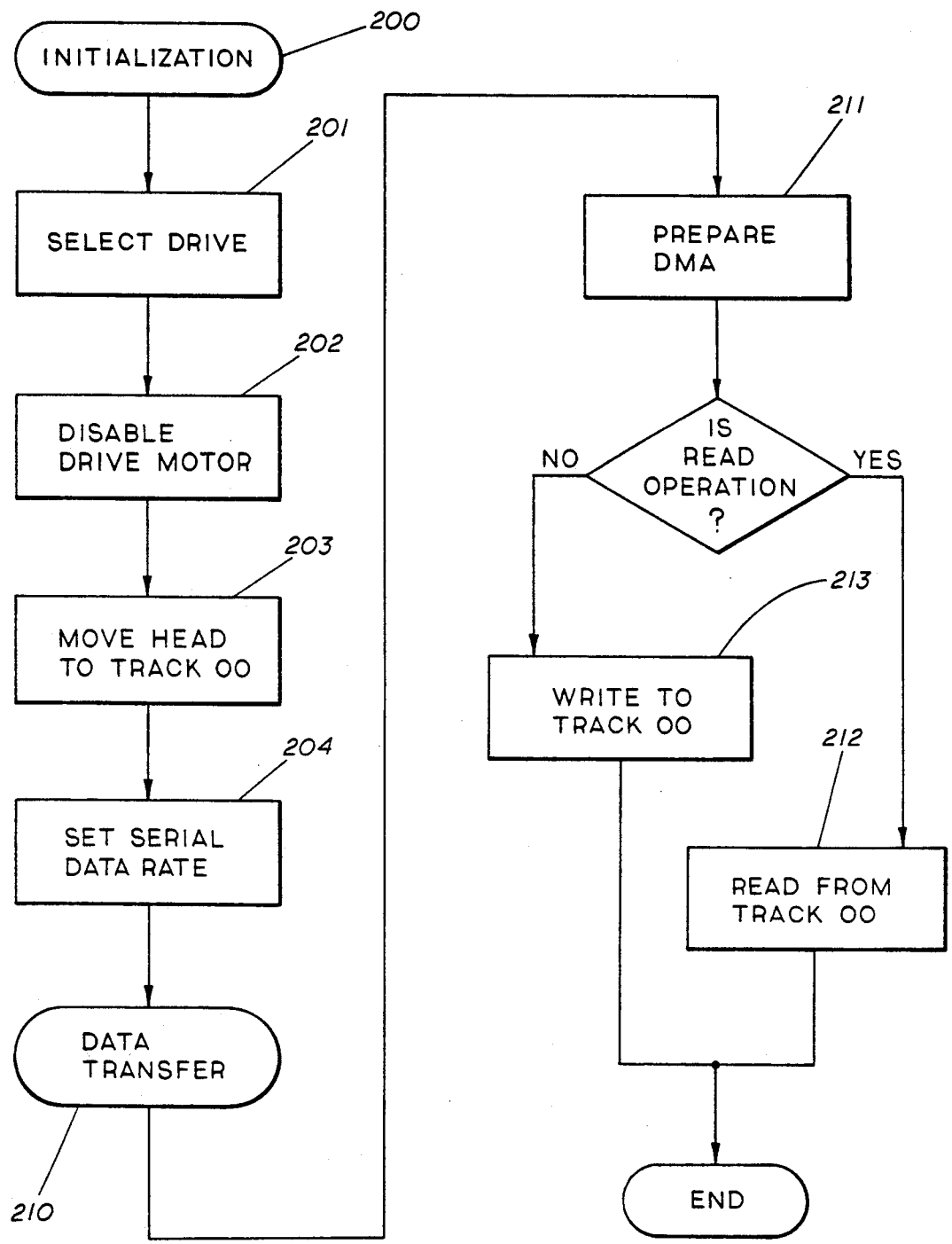
FIG. 15 shows a flow diagram of the interface program of the host computer which is interfaced by the present invention.

A special interface program which makes use of the regular diskette interface section of the host computer operating system is required when using the present invention with existing disk drives or tape backup drives. This special interface program is simplified due to the fact that computer diskette interfaces are standardized within any standard computer system. For example, in all computers compatible with the standard IBM PC-AT architecture, all the different types of diskette controllers are compatible with the established controller standard originated by the NEC uPD645A chip. FIG. 15 depicts the general flow diagram of the special interface program which is activated by the host computer prior to the use of the interface system of the present invention. During the interface initialization phase (200), the drive where the interface card is inserted is first selected (201) but its motor is disabled (202). The drive's head is engaged and moved to the position where the interface card's read/write head is located, usually at track 00 (203). As most controllers have several built in serial data transfer rates, the program selects the data rate (204) to be preferably at the highest rate. The data transfer mode (210) usually works with the host computer DMA channel 73 shown in FIG. 6 so it starts by preparing the DMA channel (211). During read operation, the data from the interface card is actually read from track 00 (212). During write operation, the data from the DMA channel is written to track 00 (213). The interface program can access either the host computer's memory or the host computer's files which are stored in a hard disk or in another diskette drive. In applications where the interface requires many short communications, the interface card may be regularly polled after every preset interval to see if there is data available from the interfaced application. Alternatively, the interface activity at the computer end may be interrupt driven using the regular interrupt capabilities of the standard diskette controllers. The actual implementation of the interface program module within the regular computer program can be done utilizing various programming techniques, including device drivers and TSR routines.

It will be understood by those skilled in the art that the foregoing description is in terms of a preferred embodiment of the present invention wherein various changes and modifications may be made without departing from the spirit and scope of the invention, as set forth in the appended claims.

What I claim is:

1. A data interface system for interfacing a first computer and a second computer comprising:

a first removable magnetic storage unit having a first read/write head and being controlled by said first computer, a first removable base inserted inside said first removable magnetic storage unit, first magnetic communication means mounted on said first removable base at a location allowing magnetic coupling between said first magnetic communication means and said first read/write head, further comprising a first output means adapted to provide an output signal responsive to magnetic flux variations generated by said first read/write head and first input means for receiving a signal to be converted to magnetic flux variations readable by first read/write head, a second removable magnetic storage unit having a second read/write head and being controlled by said second computer, a second removable base inserted inside said first removable magnetic recording system, a second magnetic communication means mounted on said first removable base at a location allowing magnetic coupling between said second magnetic communication means and the read/write head of said second removable magnetic recording system, further comprising a second output means adapted to provide an output signal responsive to magnetic flux variations generated by said second read/write head and a second input means for receiving a signal to be converted to magnetic flux variations readable by said second read/write head, and connection means coupling said first output means with said second input means and said second output means with said first input means whereby data written by said first storage unit will be read by second storage unit and vice versa.

2. A data interface system as recited in claim 1, wherein said first removable base is having a shape and a size similar to the shape and size of a magnetic medium which is used by said first removable magnetic storage unit, and wherein said second removable base is having a shape and a size similar to the shape and size of a magnetic medium which is used by said second removable magnetic storage unit.

3. A data interface system as recited in claim 1, wherein said first removable magnetic storage unit and said second removable magnetic storage unit are disk drives.

4. A data interface system as recited in claim 1, wherein said first magnetic communication means further comprises a first amplification means for amplifying said first input signal, and wherein said second magnetic communication means further comprises a second amplification means for amplifying said second input signal.

5. A data interface system for interfacing an external application system with a data processing system which comprises:

a removable magnetic storage unit connected to said data processing system having a read/write head which is adapted to transfer write data received from said data processing system onto a magnetic medium and to transfer read data previously recorded on a magnetic medium and to supply said read data to said data processing system, a removable base which is inserted inside said storage unit, means for magnetic communication with said read/write head said magnetic communication means is mounted on said base at a relatively close proximity to said read/write head, serial interface means connected to said magnetic communication means, said magnetic communication means is further adapted to output serial data stream to said serial interface means responsive to said write data of said read/write head and to convert an input serial data stream received from said serial interface means into magnetic flux variations which are readable by said read/write head, application interface means connected to said serial interface means, said application interface means is further adapted to convert said output serial stream into a parallel data in a format usable by said external application system, and to convert parallel data received from said external application system into a serial data stream which is sent to said serial interface means, and connector means for easy connection and removal of said external application system to and from said application interface means so that a plurality of external application systems may share said data interface.

6. A data interface system as recited in claim 5, wherein said serial interface means is further adapted to output an interrupt condition signal when data is received from said magnetic communication means, and wherein said application interface means further comprises a micro-controller, said interrupt condition signal is coupled to said micro-controller, and said micro-controller includes microcode storage comprising an interrupt handler handling said interrupt condition.

7. A data interface system as recited in claim 5, wherein said removable magnetic storage unit having a controller employing at least two selectable transfer rates for data recording, first transfer rate is limited to the highest transfer rate possible when recording on a magnetic medium of said storage unit, second transfer rate is higher than said first transfer rate and it is limited to the highest transfer rate of said magnetic communication means, said controller further adapted to select first transfer rate when recording on a magnetic medium and to select second transfer rate when communicating with said magnetic communication means.

8. A data interface system as recited in claim 5, wherein said removable magnetic storage unit is a disk drive, wherein said removable base is having a shape and a size similar to the shape and the size of said diskette, wherein said disk drive is adapted to provide a TRACK 00 signal to said data processing system when said read/write head is placed at the location corresponding to TRACK 00, and wherein said magnetic communication means is further mounted on said removable base in a location which is closest to said read/write head when said read/write head is placed at TRACK 00 so that said data processing system initiates communication with said planar read/write head only when said TRACK 00 signal is asserted.

9. A data interface system as recited in claim 5, wherein said removable magnetic storage unit further comprises a plurality of read/write heads for a multi-track recording and playback of data, wherein said magnetic communication means further comprises a plurality of read/write heads on said removable base at locations corresponding to said read/write heads of said removable magnetic storage unit, and wherein coupling said read/write heads on the removable base to said application interface means via a plurality of serial interface means so that a higher transfer rate of data interfaced between said external application and said data processing system flows concurrently through said plurality of read/write heads.

10. A data interface system which comprises:
a removable magnetic storage unit connected to said data processing system having a read/write head which is adapted to transfer write data received from said data processing system onto a magnetic medium and to transfer read data previously recorded on a magnetic medium and to supply said read data to said data processing system,
a removable base which is inserted inside said storage unit,
a planar read/write head comprising a relatively thin ring shaped body made from a magnetic material forming an air gap, said ring shaped body having at least one coil formed by a wire wound around said ring shaped body, said ring shaped body is embodied on said removable base so that said air gap is placed at a location which provides maximum magnetic coupling with the read/write head as said removable magnetic storage unit,
read amplifying means connected to said coil for amplifying signals induced at said coil in response to said write data of said read/write head of said removable magnetic storage unit, said amplified signal being output to said application system, and
a write amplifying means connected to said coil for amplifying data received from said application system.

11. A data interface system as recited in claim 10, wherein said removable magnetic storage unit having a controller employing at least two selectable transfer rates for data recording, first transfer rate is limited to the highest transfer rate possible when recording on a magnetic medium of said storage unit, second transfer rate is higher than said first transfer rate and it is limited to the highest transfer rate of said planar read/write head, said controller further adapted to select first transfer rate when recording on a magnetic medium and to select second transfer rate when communicating with said planar read/write head.

12. A data interface system as recited in claim 10, wherein said removable magnetic storage unit is a disk drive, wherein said removable base is having a shape and a size similar to the shape and the size of said diskette, wherein said disk drive is adapted to provide a TRACK 00 signal to said data processing system when said read/write head is placed at the location corresponding to TRACK 00, and wherein said air gap of said planar read/write head is further mounted on said removable base in a location which is closest to said read/write head when said read/write head is placed at TRACK 00 so that said data processing system initiates communication with said planar read/write head only when said TRACK 00 signal is asserted.

13. A data interface system for interfacing a data processing system with an application system which comprises:
a removable magnetic storage unit connected to said data processing system having a read/write head which is adapted to transfer write data received from said data processing system onto a magnetic medium and to transfer read data previously recorded on a magnetic medium and to supply said read data to said data processing system,
a removable base which is inserted inside said storage unit,
a planar read/write head comprising a coil having a relatively short and wide magnetic core, said coil is mounted on said removable base at a location which provides maximum magnetic coupling with said read/write head of said storage unit, said coil is vertically oriented towards the read/write head of said removable magnetic storage unit,
a read amplifying means connected to said coil for amplifying signals induced at said coil in response to said write data of said read/write head of said removable magnetic storage unit, said amplified signal being output to said application system, and
a write amplifying means connected to said coil for amplifying data received from said application system.

14. A data interface system as recited in claim 13, further comprising a thin magnetoresistive read head mounted on top of said coil in an area to be contacted by said read/write head of said removable magnetic storage unit, and wherein said read amplifying means connected to said magnetoresistive read head for amplifying signal induced at said magnetoresistive read head in response to said write data of said read/write head of said removable magnetic storage unit.

15. A data interface system as recited in claim 14, wherein said removable base is a printed circuit board and wherein said coil is a planar spiral coil etched on at least one side of said printed circuit board.

16. A data interface system as recited in claim 13, wherein said removable magnetic storage unit having a controller employing at least two selectable transfer rates for data recording, first transfer rate is limited to the highest transfer rate possible when recording on a magnetic medium of said storage unit, second transfer rate is higher than said first transfer rate and it is limited to the highest transfer rate of said planar read/write head, said controller further adapted to select first transfer rate when recording on a magnetic medium and to select second transfer rate when communicating with said planar read/write head.

17. A data interface system as recited in claim 13, wherein said removable magnetic storage unit is a disk drive, wherein said removable base is having a shape and a size similar to the shape and the size of said diskette, wherein said disk drive is adapted to provide a TRACK 00 signal to said data processing system when said read/write head is placed at the location corresponding to TRACK 00, and wherein said coil of said planar read/write head is further mounted on said removable base in a location which is closest to said read/write head when said read/write head is placed at TRACK 00 so that said data processing system initiates communication with said planar read/write head only when said TRACK 00 signal is asserted.

* * * * *